United States Patent [19]

DuVall

[11] 4,394,825
[45] Jul. 26, 1983

[54] FLUID FLOW MEASURING APPARATUS

[75] Inventor: Zell DuVall, St. Paul, Minn.

[73] Assignee: TSI Incorporated, St. Paul, Minn.

[21] Appl. No.: 305,525

[22] Filed: Sep. 25, 1981

Related U.S. Application Data

[63] Continuation-in-part of Ser. No. 155,312, Jun. 2, 1980, Pat. No. 4,331,037.

[51] Int. Cl.³ .............................................. G01F 1/56
[52] U.S. Cl. .................... 73/861.09; 73/189
[58] Field of Search ...................... 73/188, 189, 170 A, 73/272, 181

[56] References Cited

U.S. PATENT DOCUMENTS

| | | | |
|---|---|---|---|
| 1,796,547 | 3/1931 | Trout | 73/155 X |
| 2,709,365 | 1/1955 | Piety | 73/155 |
| 3,119,259 | 1/1964 | Tenbosch et al. | 73/861.12 X |
| 3,188,862 | 6/1965 | Roth | 73/194 |
| 3,317,790 | 5/1967 | Whitby | 317/4 |
| 3,470,741 | 10/1969 | Durbin | 73/194 |
| 3,648,517 | 3/1972 | Dorman | 73/194 F |
| 3,831,445 | 8/1974 | Durbin | 73/194 F |

FOREIGN PATENT DOCUMENTS 46-19829 of 1971 Japan .

2024431 of 1980 United Kingdom .

OTHER PUBLICATIONS

"Development of a Corona Anemometer for Measurement of Stratospheric Turbulence", National Bureau of Standards, Air Force Geophysics Laboratory, Air Force Systems Command, USAF, Mar. 21, 1978.

Primary Examiner—Charles A. Ruehl
Attorney, Agent, or Firm—Burd, Bartz & Gutenkauf

[57] ABSTRACT

A fluid movement measuring apparatus having ion collecting electrical conductors spaced from an ion generating source located within a housing. The housing has one or more circumferential rows of openings in communication with the space or fluid flow path between the ion generating source and ion collecting conductors. Ions migrating across the space are deflected by moving fluid in the direction of the fluid flow. Electrical currents caused by ions collected on the separate electrical conductors are directed to differential amplifiers. The differential amplifiers provide output voltages that are proportional to the differences in current collected by opposed electrical conductors. These output voltages provide information as to the movement, such as velocity and direction, of the fluid flowing in the fluid flow path.

71 Claims, 17 Drawing Figures

FLUID FLOW MEASURING APPARATUS

CROSS REFERENCE TO RELATED APPLICATION:

This Application is a Continuation-In-Part of U.S. application Ser. No. 155,312, filed June 2, 1980, for FLUID FLOW MEASURING APPARATUS, now U.S. Pat. No. 4,331,037.

The invention is directed to an apparatus for measuring of the movement of a flowing fluid, such as the velocity and direction of atmospheric air.

The apparatus is useable on movable and stationary supports to sense and measure velocity and directions of a moving fluid, as a gas, air or wind. An ionizing means is connected to a high voltage ionizing power source and establishes a supply of ions. The ionizing means is located in a protected chamber of a housing means. The housing means has a grounded disc partially closing the chamber. The disc has a central hole aligned with the ionizing means. An ion collecting means is spaced from the disc to form therewith a protected fluid flow path. The housing means supports the ion collecting means. The housing means has non-linear passages in communication with the fluid flow path allowing fluid to flow through the housing means. The non-linear fluid flow pattern minimizes velocity effects due to the presence of external structure and supporting parts for the apparatus. The housing means minimizes detrimental effects of rain, dust, rocks, and other foreign matter from getting into the flow path and causing damage or electrical short to the ionizing means and/or ion collecting means.

In one form of the ivention, the housing means has an external cylindrical side wall and semi-spherical ends which minimize turbulance in interference with the flow of fluid, as air, around and through the fluid flow path. The side wall has two rows of circumferentially spaced openings that are open to inside annular chambers. The annular chambers are in annular communication with each other and circumferentially open to the annular outer section of the fluid flow path between the ion collecting means and the disc. The two rows of openings are longitudinally spaced on opposite sides of a plane located in the direction of flow of fluid in the flow path. The two rows of openings minimize the effect of non-horizontal movement of fluid or fluid moving in upward or downward directions on the flow of fluid through the fluid flow path provided by the passage between the disc and ion collecting means.

When the high voltage ionizing power source is applied to the ionizing means, ions migrate across the fluid flow path providing an ion field. The ions that cross the path impinge upon the ion collecting means. The ion collecting means has a plurality of separated conductor plates that carry current in proportion to the ions that are collected on the plates. The apparatus measures actual velocity of the fluid which is proportional to ions collected on the plates. In one example, the ion collecting means has four generally pie-shaped plates. The plates are separated from each other and are concentrically located in side-by-side annular arranged positions. In another embodiment, the ion collecting means has two one-half circular shaped plates linearly separated from each other.

The ion collecting plates of these embodiments are electrically coupled to a differential amplifier circuit. The differential amplifier circuit produces output voltage that are proportional to the difference in current collected by opposed current collector plates. The output voltages provide information as to the movement of the fluid flowing in the fluid flow path.

The invention includes a fluid movement measuring apparatus having an ion collecting means provided with four quadrant electrical conductor members. Each member has a general pie shape with side edges normally disposed relative to each other. Adjacent members have side edges that are spced from each other. Ionizing means spaced from the conductor members generate ions that migrate across a fluid flow path and impinge on apex sections of each conductor member. When there is no fluid flow in the path, the currents resulting from the ions that impinge on the conductor members are substantially equal. Moving fluid in the flow path will cause ions to deflect in the direction of the fluid flow. This produces differences in currents in the conductor member. The amplifier means receives the total current from all the conductor members and provides output signals, $U_x$ and $U_y$, as to the differences in the currents of opposite pairs of conductor members. These output signals are used to provide information as to the velocity and direction of fluid moving in the flow path.

The apparatus has no moving parts and requires only minimum maintenance. It is rugged in construction and versatile in use with numerous types of flowing fluids. It can be used as an instrument providing continuous in-situ air movement information. These and other uses and advantages of the apparatus are set out in the drawings and following specification.

Figure 1:
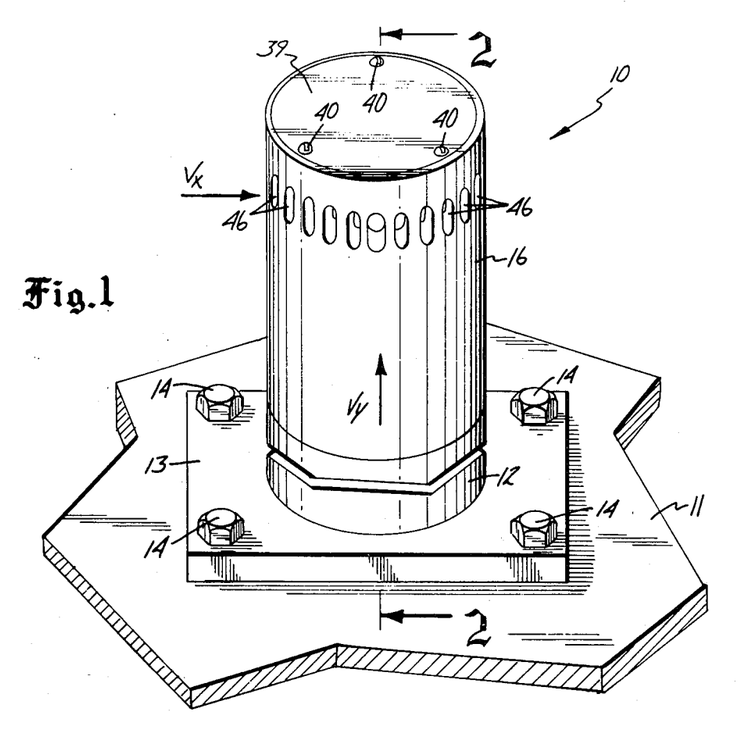
FIG. 1 is a foreshortened perspective view of an apparatus of the invention for measuring atmospheric air velocity and direction.
Figure 2:
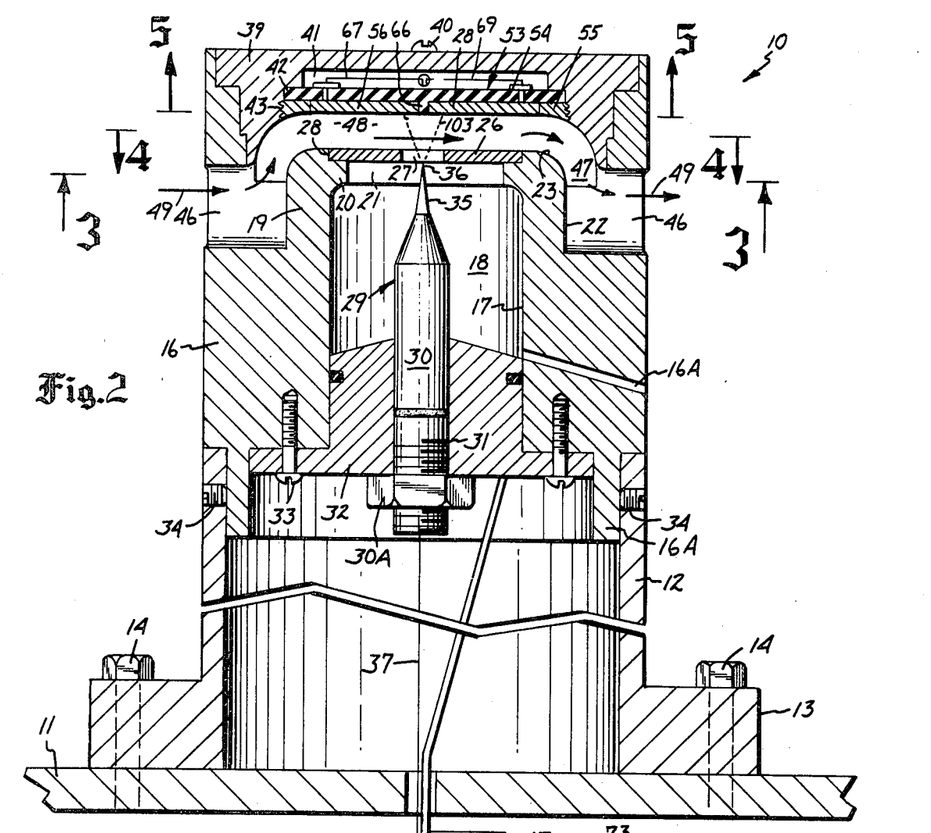
FIG. 2 is an enlarged sectional view taken along the line 2—2 of FIG. 1.

Referring to FIGS. 1 and 2, there is shown an apparatus indicated generally at 10 for measurement of movement, i.e., velocity and direction, of atmospheric air. The term movement, as herein used, refers to either velocity or speed of a flowing fluid and both the velocity and direction of a flowing fluid. Apparatus 10 can be used to measure the movement of other flowing fluids and the direction of flow of these fluids. The following description is directed to measurement of velocity and direction of moving atmospheric air.

Apparatus 10 is secured to a support 11, such as a vehicle or similar mobile unit. Support 11 can be a stationary structure. Apparatus 10 is mounted on top of a post or cylindrical member 12. Post 12 is attached to a base or plate 13. A plurality of bolts 14 secure base 13 to support 11. Other means can be used to attach base 13 to support 11 and casing 12; for example, base 13 can be threaded into a hole in support 11.

Apparatus 10 has a housing or casing 16 having an inside cylindrical wall 17 surrounding a chamber 18. The upper portion of casing 12 has a cylindrical sleeve or tubular projection 19. The upper end of sleeve 19 has an inwardly directed annular lip 20 surrounding an opening 21 in communication with chamber 18. Sleeve 19 has a cylindrical outside wall 22 that is joined to an annular flat top wall 23. Top wall 23 has an annular shoulder 24 forming a groove or recess accommodating an end member comprising an electrical conductive or metal disc or washer 26. Washer 26 has a central hole 27 axially aligned with the longitudinal axis of chamber 18. The outer edge 28 of washer 26 cooperates with an annular wall on sleeve 19 to mount washer 26 on sleeve 19 in engagement with lip 20. The upper surface of washer 26 is flat and coplanar with top wall 23.

As shown in FIG. 2, an ion source means indicated generally at 29 is located in chamber 18. Ion source means 29 includes a cylindrical post 30 having a threaded end turned in a threaded hole 31 in a tub 32. Bolts 33 secure hub 32 to the bottom of casing 16. An annular portion 16A of casing 16 telescopes into the top of post 12. Set screws 34 in post 12 engage casing portion 16A to attach casing 16 to post 12. Post 30 insulatively supports a needle 35 having a point end 36. Needle 35 is located along the longitudinal central axis of chamber 18 in longitudinal alignment with the center of hole 27 in washer 26. Point 36 is located a short distance below hole 27 so that washer 26 protects needle 35 from foreign material carried with the air moving through apparatus 10. Post 30 can be longitudinally adjusted on hub 31 by releasing the lock nut 30A and rotating post 30. This allows adjustment of the distance between needle point 36 and hole 27 of washer 26. A line 37 connects needle 35 with a high voltage source 38. Ion source means 29 generates an ion current or beam 103 that moves from needle point 36 due to the field generated by the high voltage applied to needle 35 by high voltage source 38. The shape and size of the ion beam 103 is adjusted or turned by adjusting the distance between needle point 36 and washer 26. Washer 26 collects the peripheral ions emanating from needle 35. Casing 16 has an inclined small hole 16A allowing fluid, as water, to flow out of chamber 18.

Figure 3:
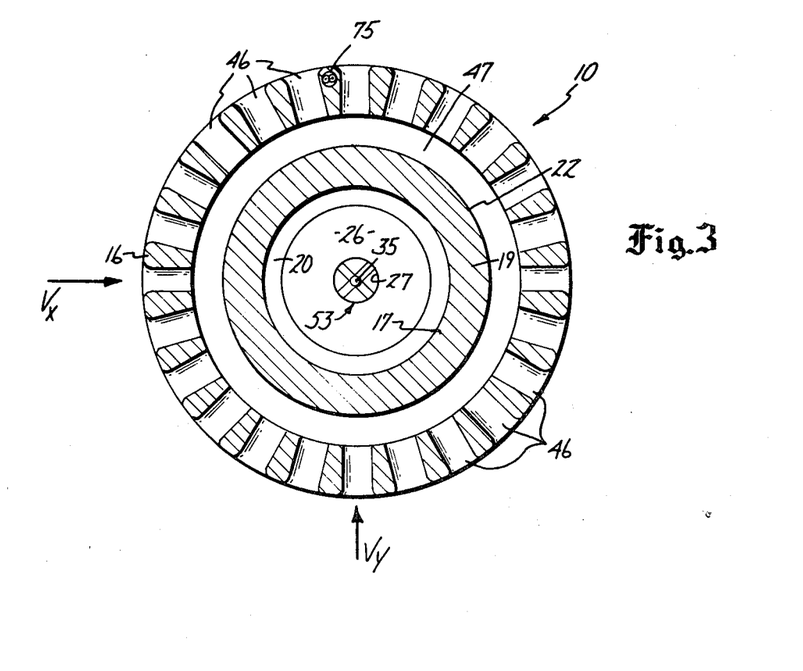
FIG. 3 is a sectional view taken along the line 3—3 of FIG. 2.
Figure 4:
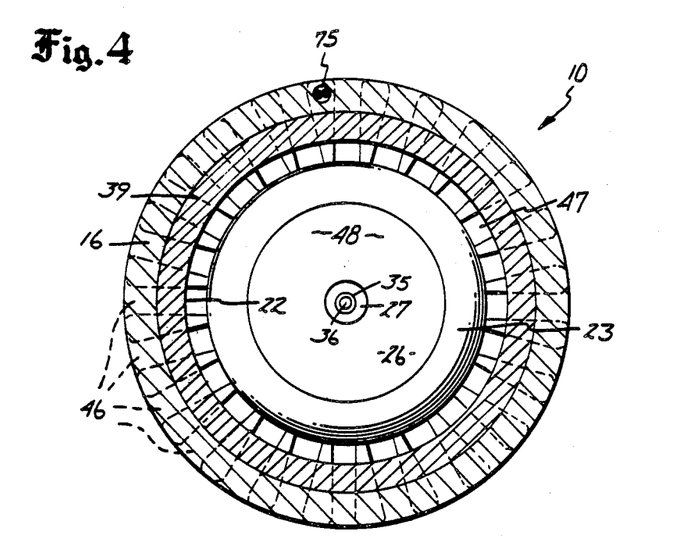
FIG. 4 is a sectional view taken along the line 4—4 of FIG. 2.

As shown in FIGS. 1 and 2, a cap 39 comprising a second member of the housing is attached with a plurality of bolts 40 to the top of casing 16. The bottom of cap 39 has a recess or pocket 41 surrounded by a wall having an annular shoulder 42. A threaded annular wall 43 extends downwardly from shoulder 42 and merges with an inside annular concave smooth wall 44. Casing 16 has a plurality of holes 46. Holes 46 are circumferentially spaced from each other and are in communication with an annular passage or chamber 47. As shown in FIG. 1, holes 46 are elongated in an upright or longitudinal direction and extended radially into casing 16. As shown in FIG. 3, twenty-four holes 46 are circumferentially spaced around casing 16. Each hole 46 is open to a separate arcuate portion of the common annular chamber 47. Annular chamber 47 extends upwardly and opens into a circular space or a protected flow path 48. Walls 22 and 44 define opposite sides of chamber 47. Top wall 23 and washer 26 are located at a level above the top of holes 46 so that the air flow, indicated by arrows 49, is non-linear as it moves from one or more holes 46. The adjacent edge of conductor plates 56–59 extends along parallel cord lines on opposite sides of a radial line. The lateral space or gap between the adjacent edges of the conductor plates 56–59 is uniform.

Figure 5:
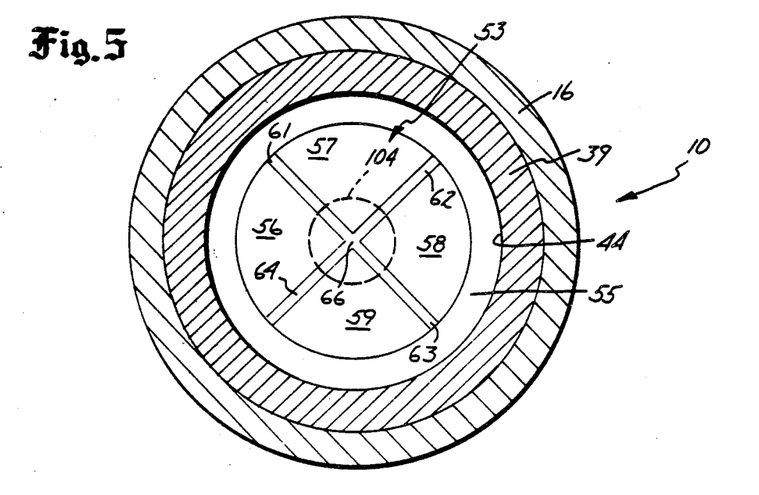
FIG. 5 is a sectional view taken along the line 5—5 of FIG. 2.

Referring to FIGS. 2 and 5, an ion collector means or ion collector plate assembly indicated generally at 53 covers recess 41 and forms the top wall for flow path 48. Collector plate means 53 has an electrically non-conductive circular base 54 of plastic, glass, ceramic, or the like held in engagement with annular shoulder 42 with a ring 55. Ring 55 has external threads which cooperate with threads 43 to hold base 54 in a fixed position on head 38. Other means, as a press fit or adhesive, can be used to secure ring 55 to head 38. Ring 55 is an electrically non-conductive annular member that can be removed to permit the ion collector means 53 to be removed and replaced.

As shown in FIG. 5, ion collecting means 53 has four quadrant electrical conductor members or plates 56, 57, 58, and 59 attached to the lower surface of base 54 in an annular pattern. As shown in FIG. 5, the adjacent linear edges of the quadrant conductor plates 56–59 are isolated or spaced from each other with radial strips 61, 62, 63, and 64. Strips 61–64 are non-electrical conductive members that are merged or joined to each other at center 66. As shown in FIG. 2, center 66 is in longitudinal alignment with needle point 36 and the axis of hole 27 in washer 26.

Figure 6:
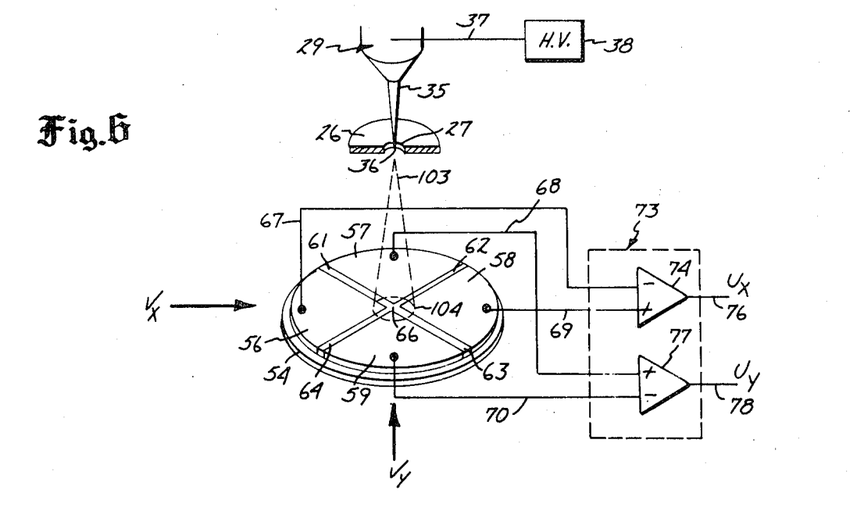
FIG. 6 is a diagrammatic view of a quadrant ion collection plate assembly connected to a differential amplifier circuit.

Each conductor plate 56–59 is connected to an amplifier circuit indicated generally at 73 with separate lines 67, 68, 69, and 70. Lines 67–70 form a cable that is located in a passage 75 in casing 16 and cap 39. As shown in FIG. 6, line 67 is connected to segment 56. Line 68 is connected to segment 57. Line 69 is connected to segment 58. Line 70 is connected to segment 59. Lines 67 and 69 are connected to a differential amplifier 74 joined to a first output line 76 for carrying output signals $U_x$. Lines 68 and 70 are connected to a second differential amplifier 77 joined to an output line 78 for carrying the second output signal $U_y$. Amplifier circuit 73 receives the total current imparted on the ion collector means 53 by the ion beam 103. The output signals $U_x$ and $U_y$ from amplifiers 74 and 77 are directly proportional to the differences in currents in plates 55 and 58, and 57 and 59, respectively. These current differences provide information as to the velocity and direction of air moving in the flow path 48.

Figure 7:
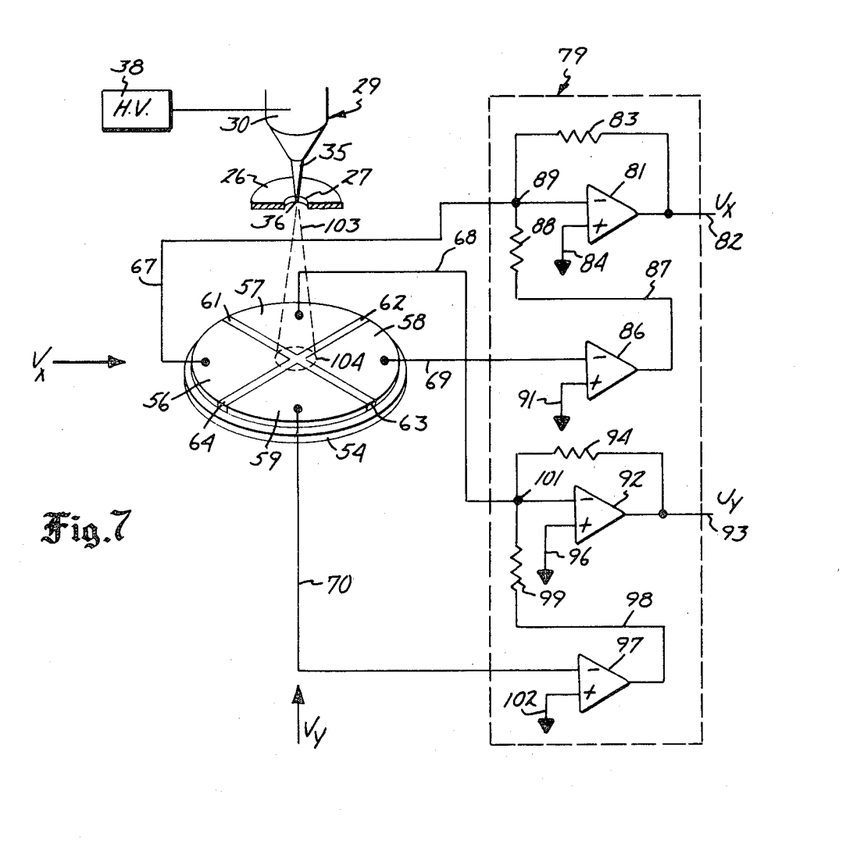
FIG. 7 is a diagrammatic view similar to FIG. 6 showing a modification of the amplifier circuit.

Referring to FIG. 7, there is shown a modification of the amplifier circuit indicated generally at 79 electrically coupled to the lines 67, 68, 69, and 70 leading from the ion collector plate means 53. Amplifier circuit 79 has a first differential amplifier 81 joined to line 67 and an output line 82 carrying the output signal $U_x$. A resistor 83 is connected to lines 67 and 82 in parallel with amplifier 81. A line 84 connects amplifier 81 to a power source. A second differential amplifier 86 connected to line 69 and an output line 87 is electrically coupled to line 67 through a resistor 88 and connection 89. The output of amplifier 86 is added to the input of the first differential amplifier 81. A line 91 connects amplifier 86 to a power source.

A third differential amplifier 92 is connected to an input line 68 and an output line 93. Output line 93 carries the output signal $U_y$. A resistor 94 is connected in parallel with amplifier 92 and is connected to lines 68 and 93. A line 96 connects amplifier 92 to a power source. A fourth differential amplifier 97 is connected to input lines 70 and output lines 98. Line 98 is connected with a resistor 99 and connection 101 to the input line 68 of amplifier 92. A line 102 connects amplifier 97 to a power source.

As shown in FIG. 6, radial strips 61 and 64 are oriented at 45 degrees relative to the selected direction $V_x$ of the moving atmospheric air. In operation, the output voltage $U_x$ is proportional to the difference in current collected by collector plates 56 and 58. The output voltage $U_y$ is proportional to the difference in current collected by plates 57 and 59. Ion source generator 29 generates an ion field, as shown by broken line ion beam 103, that moves transversely across the air flow path 48 due to the field generated by the high voltage at needle point 36. The ions are collected on the apex sections of collector plates 56, 57, 58, and 59. When there is no movement of air through the passage 52, an equal number of ions will be collected on each of the plates 56–59. As the velocity of the air moving in flow path 48 increases, the ion beam will deflect due to the air motion. The amount of the deflection of the ion beam 103 is proportional to the velocity of the air moving in the flow path 48. In other words, an increase in air velocity $V_x$ will increase the ion beam deflection and increase the output voltage $U_x$. If the air velocity $V_x$ reverses direction, the output voltage $U_x$ will go negative.

Air flowing in the direction of vector $V_x$ moves in flow path 48 generally parallel to the radial center line of sector plates 56 and 58. The ion beam 103 will be deflected by the moving air in the direction of the flow of the air, i.e., parallel to radial center line of sector plates 56 and 58. The circular pattern 104 of ions collected on apex sections of plates 56 and 58 will shift to the right, as seen in FIG. 6, causing a decrease in current in plate 56 and an increase in current in plate 58. The greater the flow rate or speed of the air, the greater the ion beam shift. Amplifier output $U_x$ is directly proportional to the difference in the currents of plates 56 and 58 making the output insensitive to fluid means. Ion beam 103 encompasses portions of the apex sections of plates 57 and 59. The currents collected by plates 57 and 59 will be equal when the air is moving in the direction of vector $V_x$, since the changes in the currents will be the same.

When the air is moving in the direction of vector $V_y$, ion beam 103 will be deflected upwardly, as seen in FIG. 6, causing a current difference in plates 57 and 59. Amplifier output is directly proportional to the difference in currents of plates 57 and 59. Amplifier output $U_x$ will not change as the current of plates 56 and 58 is the same when air moves in the $V_y$ direction.

When air moves along a vector between vectors $V_x$ and $V_y$, the new vextor has $V_x$ and $V_y$ components. These air movement components will cause current differences between both pairs of plates 56, 58 and 57, 59. The difference in voltages $U_x$ and $U_y$ provides information as to the velocity of the air and the direction of movement of the air.

Figure 8:
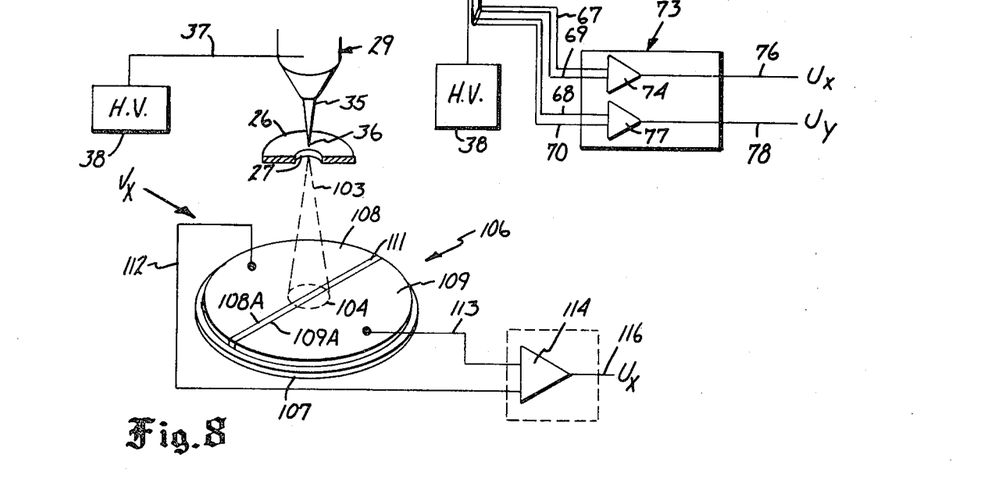
FIG. 8 is a diagrammatic view of a semi-circular ion collector plate assembly connected to a differential amplifier for measuring the velocity vector of a flowing air.

Referring to FIG. 8, there is shown a modification of the ion collector plate means indicated generally at 106 useable in the apparatus for measurement of the air velocity vector, $V_x$. The collector plate means 106 has electrically non-conductive circular base 107 supporting a pair of semi-circular conductor plates 108 and 109. The plates 108 and 109 have adjacent spaced parallel edges 108A and 109A, respectively, that extend diametrically across base 107. A transverse linear strip 111 of non-electrical conductive material separates the linear adjacent edges of conductor plates 108 and 109 from each other. Conductor plate 108 is connected with a line 112 to the negative terminal of a differential amplifier 114. Conductor plate 109 is connected with a line 113 to a positive terminal of differential amplifier 114. Amplifier 114 has an output line 116 accommodating the output voltage $U_x$.

In use, the ion source 29 generates an ion beam 103. The ion beam emanates from the needle point 36 toward the ion collector plate means 106. The ion beam 103 moves through hole 27 in washer 26 and spans the protected flow path 48. The ions that hit the plate means 106 are located within a circular pattern 104 concentric with the center of the ion collector plate means 106 when fluid is not flowing in passage 48. The linear strip 111 bisects pattern 104 when the air velocity $V_x$ is 0. The strip 111 between edges 108A and 109A is perpendicular to the air flow direction $V_x$. As the velocity of the air in the flow path 48 increases, the ion beam 103 will deflect in the direction of the movement of the air. The result will be an increase in the number of ions collected on the collector plate 109 and a decrease in the number of ions collected on the plate 108. The difference in the current in lines 112 and 113 will be amplified by the amplifier 114 which generates a positive output voltage $U_x$ proportional to the difference in the current collected by collector plates 108 and 109. The output voltage $U_x$ is a measure of the air velocity $V_x$.

Figure 9:
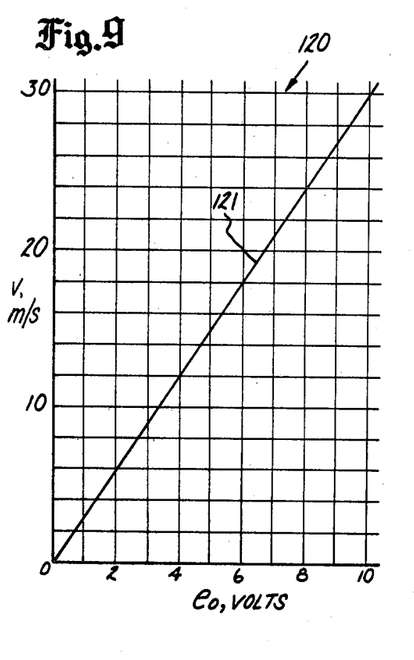
FIG. 9 is a graph of test results on $V_x$ linearity of the apparatus of FIGS. 1–6.

FIG. 9 is graph 120 plotting the $V_x$ component of air velocity in meters per second versus the output voltage $U_x$ of amplifier 74. The output voltage $U_x$ has a linear relationship, shown by linear line 121, with respect to the $V_x$ component of velocity of the air.

Figure 10:
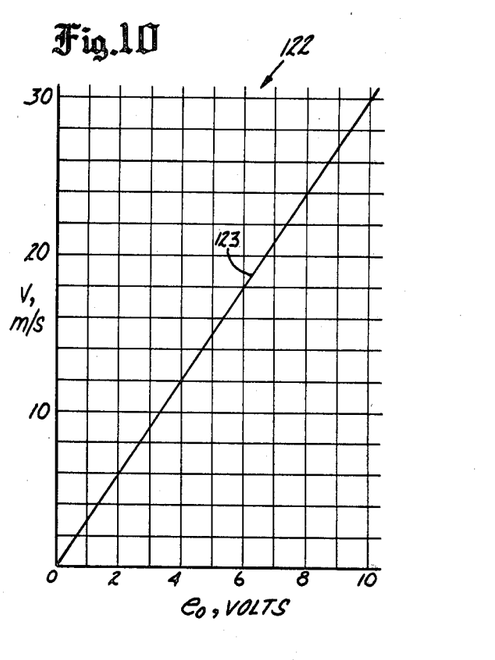
FIG. 10 is a graph of test results on $V_y$ linearity of the apparatus of FIGS. 1–6.

As shown in FIG. 10, a linear relationship also exists for the $V_y$ component of velocity of the air. FIG. 10 is a graph 122 showing the linear line 123 plotting the $V_y$ component of air velocity in meters per second versus output voltage $V_y$ of amplifier 77.

Figure 11:
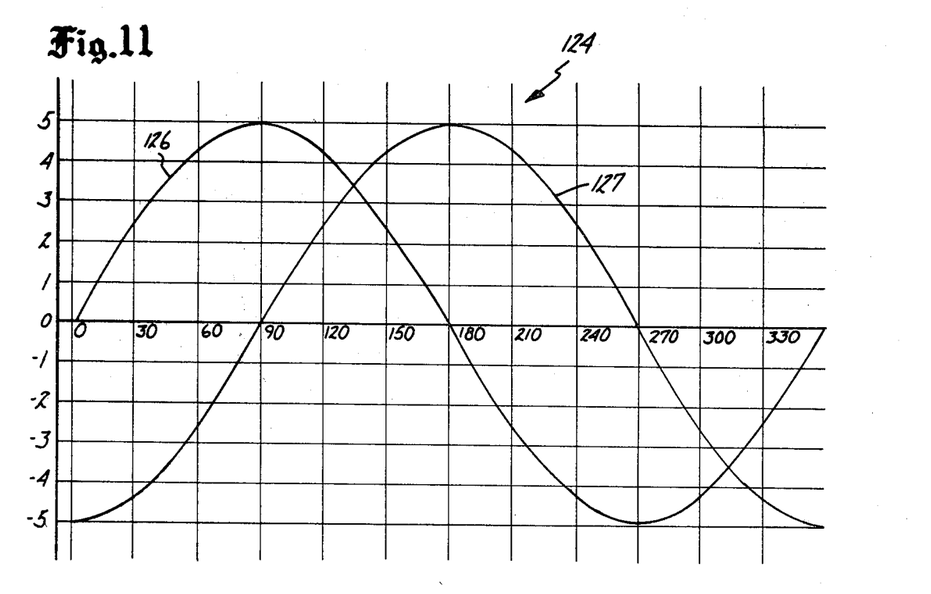
FIG. 11 is a graph of test results on angular sensitivity of the apparatus of FIGS. 1–6.

FIG. 11 is a graph 124 showing the response of the apparatus when it is rotated 360 degrees. The curve 126 is a sine wave of recorded output voltage $V_x$ of amplifier 74 of the x component of the air velocity as the apparatus is rotated 360 degrees. The curve 127 is a sine wave of the recorded output voltage of $V_y$ of amplifier 77 of the y component of the air velocity as the apparatus is rotated 360 degrees. The sine wave responses show that the apparatus has utility for environmental wind measurements.

Figure 12:
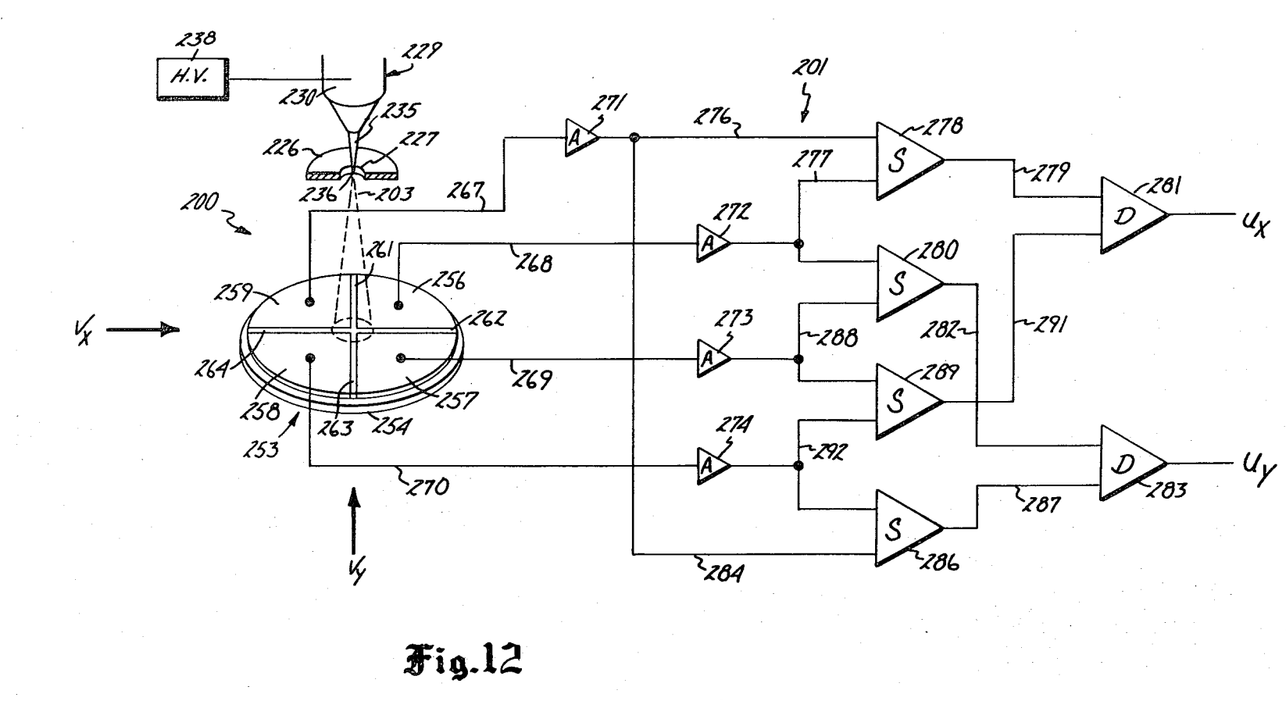
FIG. 12 is a diagrammatic view of a quadrant ion collection plate assembly connected to a modified differential amplifier circuit.

Referring to FIG. 12, there is shown a fluid flow measuring apparatus, similar to the apparatus of FIGS. 1-5, indicated generally at 200 connected to a differential amplifier circuit indicated generally at 201. The structure of fluid flow measuring apparatus 200, identical to the structure of the apparatus shown in FIGS. 1-5, has the same reference numerals with the prefix 2. The radial strips 261 and 263 are oriented at 90 degrees relative to the selected direction $V_x$ of the moving air. The strips 262 and 264 are oriented 90 degrees relative to the direction $V_y$. The ion beam 203 emanating from the needle point 236 is directed toward the center of ion collector plate assembly 253. When there is no movement of air across the electrical conductor members 256, 257, 258, and 259, an equal number of ions will be collected on each of the members 256-259. As the velocity of the air moving relative to conductor members 256-259 increases, the ion beam 203 will deflect due to the air motion. The amount of the deflection of the ion beam 203 is proportional to the velocity of the air moving in the flow path adjacent conductor members 256-259. An increase in the velocity $V_x$ of the air will increase the ion beam deflection and thereby increase the output voltage $U_x$. If the velocity of $V_x$ reverses direction, the output voltage $V_x$ will go negative. When the air is moving in the direction of vector $V_y$, ion beam 203 will deflect along the length of the strips 261 and 263 and thereby increase the ions collected by the conductor members 256 and 259 and increase the output voltage $U_y$.

The differential amplifier circuit 201 is connected to the conductor members 256-259 with separate lines 267, 268, 269, and 270. Amplifiers 271, 272, 273, 274 are interposed in the lines 267-270, respectively, to amplify the electrical signals. Amplifier 271 is connected with line 276 to a summing amplifier 278. The output of summing amplifier 278 is carried via line 279 to a differential amplifier 281 having output voltage $U_x$. Amplifier 272 is connected with lines 277 to summing amplifier 278. Line 277 is also connected to summing amplifier 280. The output of summing amplifier 280 is carried via line 282 to a differential amplifier 283 having output voltage $U_y$.

A line 284 connects the output of amplifier 271 to a third summing amplifier 286. The output of amplifier 286 is connected via line 287 to differential amplifier 283. Amplifier 283 connected to conductor member 257 has an output line 288 connected to summing amplifiers 280 and 289. The summing amplifier 289 has an output line 291 connected to differential amplifier 282. Amplifier 274 is connected with output line 292 to summing amplifiers 286 and 289.

In operation, the output voltage $U_x$ is proportional to the difference in current collected by the conductor members 256, 259, and 257, 258. The difference between the two pairs of conductor members 256, 259, and 257, 258 provides a signal as to the direction of movement of the air relative to the conductor members 256-259. The amount of the difference between the currents collected by the conductor members 256-259 is proportional to the velocity of the air moving relative to the conductor members 256-259. The output of differential amplifiers 281 and 283 is non-linear. These signals must be linearized before they can be processed for vector and magnitude signals. A suitable microprocessor (not shown) is used to linearize the output signals from differential amplifiers 281 and 283.

Figures 13, 14:
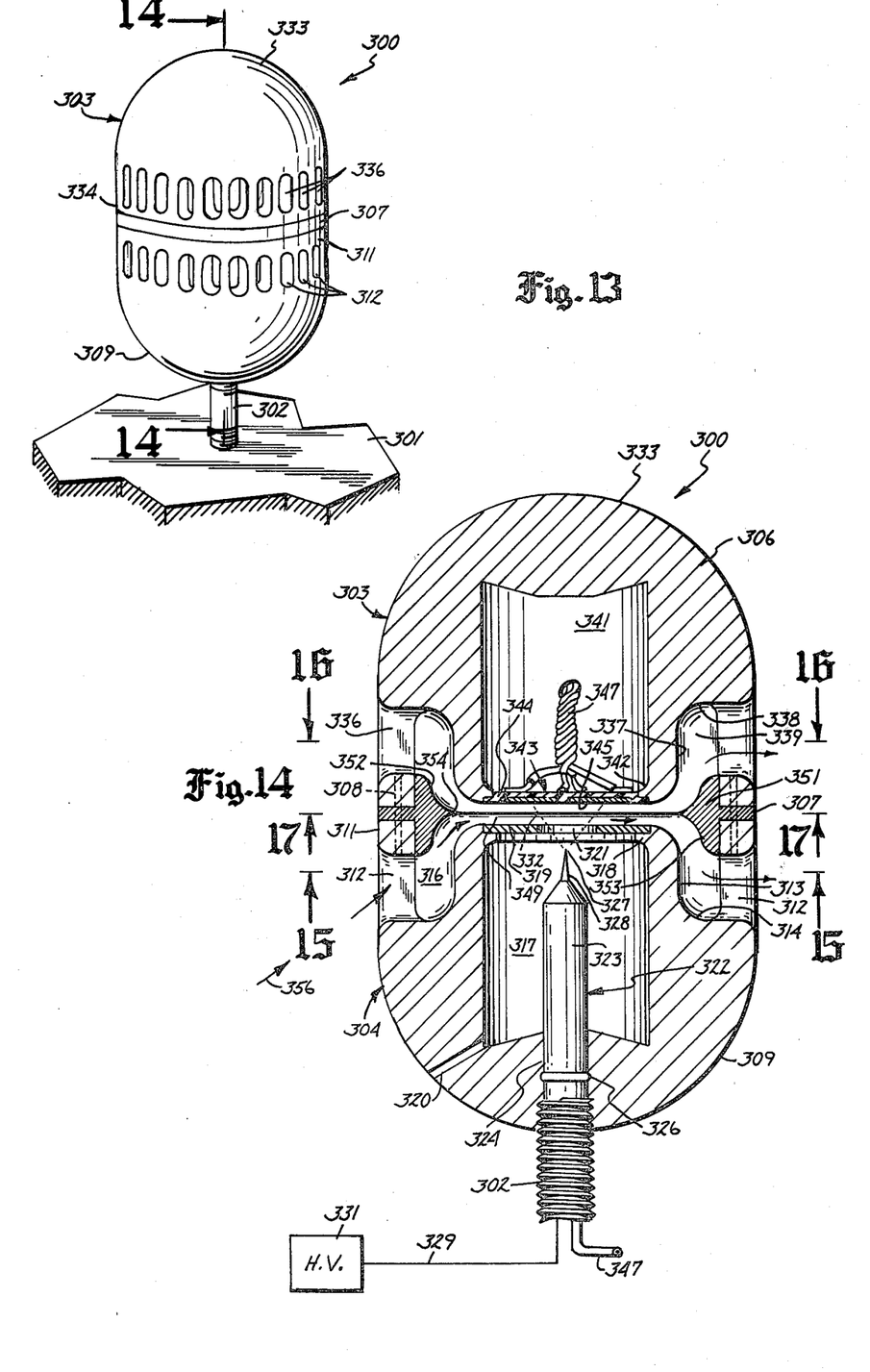
FIG. 13 is a perspective view of a modification of the apparatus of the invention for measuring atmospheric air velocity and direction.
FIG. 14 is an enlarged sectional view taken along the line 14—14 of FIG. 13.

Referring to FIGS. 13 and 14, there is shown the modification of the apparatus for measurement of movement of a fluid, such as atmospheric air, indicated generally at 300. The term "movement", as herein used, refers to either the velocity or speed of a flowing fluid and the velocity and direction of a flowing fluid. The following description is directed to the measurement of velocity and direction of moving atmospheric air. The velocity and direction of movement of other fluids can be measured by apparatus 300.

Apparatus 300 is attached to a support 301 with an upright post 302. Support 301 can be the ground, a structure supported on the ground, a vehicle, a ship, or similar mobile unit. Apparatus 300 preferably is separated from support 301. However, apparatus 300 can be connected directly to support 301.

Apparatus 300 has a housing indicated generally at 303 comprising a first or lower casing 304 and a second or upper casing 306. Casings 304 and 306 are mounted on an annular ring 307. A plurality of fastening means 308, such as bolts, pins, or the like, connect casings 304 and 306 to ring 307. Other means, including threads, can be used to attach casings 304 and 306 to opposite sides of ring 307.

Lower casing 304 has a semi-spherical lower end 309 that merges with a generally cylindrical side wall 311. Cylindrical side wall 311 has an array or plurality of circumferentially spaced openings 312 extended around side wall 311 in a circular first row of openings. Openings 312 have upright elongated generally rectangular shapes with rounded upper and lower ends. The openings 312 can have other shapes, as circular, square, triangular, or hexagonal. Upright ribs 315 circumferentially space adjacent openings 312. Each rib 315 has generally flat radial side walls so that each of the openings 312 has a generally uniform width. Each of the openings 312 are identical in size and cross section. Openings 312 face an inside cylindrical upright wall 313 that merges with an annular concave curved bottom wall 314. Walls 313 and 314 form the inside surfaces of an annular passage or chamber 316. Openings 312 are in communication with annular passage 316 which is located between and in communication with a circular outer section of a fluid flow passage or path 349, hereinafter described, and the inner ends of openings 312. The openings 312 and annular passage 316 are offset or spaced from the fluid flow plane of the flow path so that the fluid flows through openings 312 and passage 316 to flow path 349 is a non-linear or reverse curved path.

Casing 304 has a central chamber 317. The upper portion of wall 313 has an inwardly directed annular top wall or lip 318 supporting a circular disc or washer 319. Disc 319 has a central hole 321 that is aligned with the longitudinal axis of chamber 317 and casing 304. Casing 304 has a plurality of downwardly inclined outlet passages 320 to open to chamber 317 to allow drainage of liquids, as water, from chamber 317.

An ion source means indicated generally at 322 is mounted on casing 304. The ion source means 322 comprises a generally cylindrical member or post 323 having a lower end located in an upright hole 324 in the bottom of casing 304 and an upper end extended into chamber 317. An O-ring 326 surrounds post 323 and engages the wall of the hole 324. A longitudinal needle 328 projects from the upper end of post 323. Needle 328 terminates in a point 327 that is located below the plane of the disc 319. Needle point 327 is located along a line that passes through the center of hole 321. Post 323 is longitudinally movable relative to casing 324 so that needle point 327 can be adjusted relative to disc 319. A line 329 connects needle 328 with a high voltage source 331. Ion source means 322 generates an ion current or beam 332 that flows from needle point 328 due to the field generated by the high voltage applied to needle 328 by high voltage source 331. The shape and size of ion beam 332 is adjusted or tuned by adjusting the distance between needle point 327 and the plane of disc 319. Disc 319 is grounded and collects peripheral ions emanating from needle point 327.

The second or upper casing 306 has a semi-spherical upper end 333 merged with an upright cylindrical outside wall 334. Wall 334 has an array or plurality of circumferentially spaced openings 336.

Casing 306 has an annular passage or chamber 339 located between and in communication with openings 336 and a circular outer section of fluid flow passage or path 349. Openings 336 and passage 339 are offset or spaced from the horizontal fluid flow plane of flow path 349 so that the fluid flows through openings 336 and passage 339 to flow path 349 in a non-linear or reverse curved path. The offset of openings 336 is opposite and equal to the offset of openings 312 relative to the flow plane of the flow path 349. Openings 336, as shown in FIGS. 13 and 14, are vertically aligned and vertically spaced from openings 321. Openings 336 have a generally rectangular shape with rounded upper and lower ends. Openings 336 can have other shapes, as circular, square, triangular, or hexagonal. Each opening 336 is of a size and shape of an opening 312.

Figures 15, 16, 17:
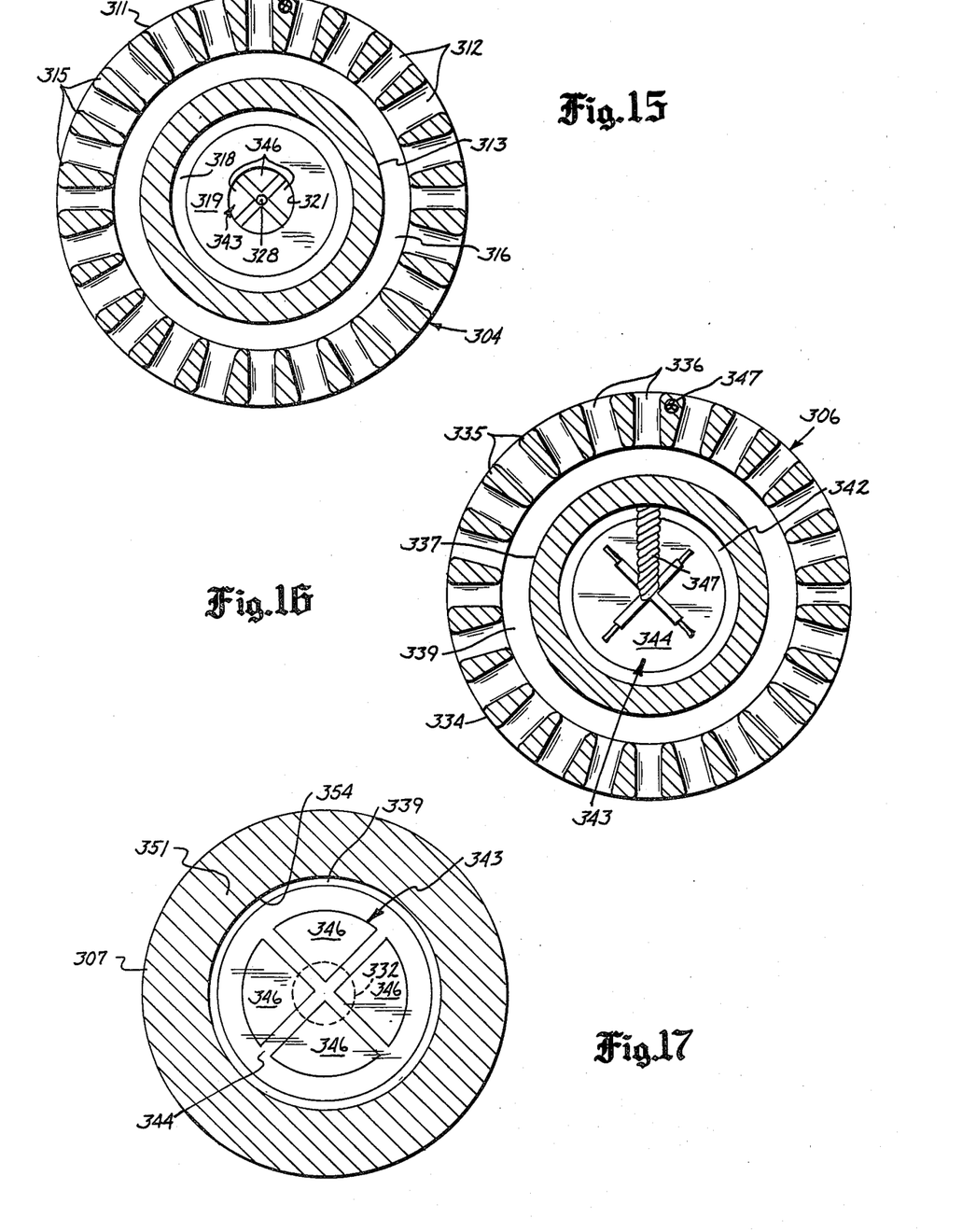
FIG. 15 is an enlarged sectional view taken along the line 15—15 of FIG. 14.
FIG. 16 is an enlarged sectional view taken along the line 16—16 of FIG. 14.
FIG. 17 is a sectional view taken along the line 17—17 of FIG. 14.

As shown in FIG. 15, casing 304 has 24 circumferentially spaced openings 312. As shown in FIG. 16, casing 306 has 24 circumferentially spaced openings 336. Other numbers of openings can be in casings 303 and 304. The two rows of openings 312 and 336 are longitudinally spaced from each other on opposite sides of a plane located in the direction of the flow of air in passage 349. The rows of openings 312 and 336 being located above and below the air flow passage or path 349 minimize the effect of non-horizontal movement of atmospheric or external air or air moving in upward or downward directions on the flow of air in air flow passage 349. Also, the two rows of openings 312 and 336 minimize the effect of circular air flow patterns around housing 303 on the flow of air in the air flow passage 349. The number of rows of openings around housing 303 can be more than two rows. For example, four rows of openings can be employed to provide air passages open to the annular chambers 316 and 339. Generally upright ribs 335 are located between adjacent openings 336. As shown in FIG. 16, ribs 335 have generally radial side walls and rounded inner and outer walls. The side walls of adjacent ribs are generally parallel to each other so that openings 336 have a generally uniform width from the outside to the inside of the openings. Each of the openings 336 has the same size and shape.

Returning to FIG. 14, casing 306 has a cylindrical inside wall 337 facing the inside ends of openings 338. Wall 337 is joined to a concave curved radial outwardly directed wall 338 which is aligned with the top of openings 336. Walls 337 and 338 form an annular passage or chamber 339 adjacent the inside of openings 336. Annular chamber 339 is concentric with annular chamber 316. Wall 337 has an inwardly directed lip or bottom wall 342 supporting an ion collector means or ion collector plate assembly indicated generally at 343. Ion collector plate assembly 343 has a generally cylindrical circular non-electrical conductive base 344 mounted on wall 342. A plurality of electrical conductor plates 346 are mounted on the lower side of base 344.

As shown in FIG. 17, four quad-shaped conductor plates 346 are mounted on the bottom surface of plate 344. Plates 346 have adjacent linear edges that are laterally spaced and generally parallel to each other. Plates 346 are connected with separate lines 347 which extend through suitable holes in casing 306 and casing 304 through post 302 to an amplifier circuit, such as the circuit shown in FIG. 6. Alternate amplifier circuits are shown in FIGS. 7 and 12.

As shown in FIG. 14, disc 319 is laterally spaced from the ion collector plate assembly 343. A fluid flow passage 349 located between disc 319 and ion collector plate assembly 343 is circumferentially open to the annular chambers 316 and 329. An annular body 351 integral with the inside of ring 307 has a concave upper surface 322 facing the chamber 339 and a concave curved lower annular surface 353 facing the chamber 316. The surfaces 352 and 353 are joined at an inside sharp edge or rib 354 extended along a plane that is along the midline or center plane of fluid flow passage 349.

In use, the cylindrical outside walls 311 and 334 and semi-spherical upper and lower ends 309 and 333 of the casings 303 and 304 provide a minimum of interference with the flow of air past housing 303. The double row of circumferential openings 312 and 336 allow air to flow into chambers 316 and 339 and through passage 349. The two circumferential rows of openings 312 and 336 allow horizontal flowing air and air from upper and lower angles, such as indicated by arrow 356, to flow into annular chambers 316 and 339 with a minimum of disturbance of the air flow through the fluid flow passage 349. The velocity of the air flowing through the fluid flow passage 349 is not affected by the angle of the air or direction of air flow into openings 312 and 336. The rows of openings 312 and 326 being located above and below the plane of the air flow passage 349 minimize the effect of non-horizontal movement of atmospheric or external air and circular air flow patterns on the flow of air in the air flow passage 349.

The air in flow passage 349 moves generally parallel to the radial center line of current collector plates 346. Ion beam 332 will be deflected by the air moving in the direction of the flow of air, i.e., parallel to the radial center line of plates 346. The circular pattern 332 of ions collected on the apex sections of the plates 346 will shift causing a decrease in current in some of the plates and an increase of current in the remaining plates. The greater the flow rate or speed of the air, the greater the ion beam shift. The amplifier output is directly proportional to the difference in the currents of the plates making the output insensitive to the fluid means. The operation of the ion collector plate assembly 343 and the amplifiers is identical to the operation of the amplifier circuits shown in FIGS. 6, 7, and 12.

While there has been shown and described several embodiments of the apparatus for measuring air movement, it is understood that changes in the structures and amplifier circuits may be made by those skilled in the art without departing from the invention. Also, the apparatus can be used to measure velocity and direction of other moving fluids, including gases other than air and a mixture of gas and particles. The invention is defined in the following claims.

I claim:

1. An apparatus for measuring the movement of a flowing fluid comprising: housing means having a chamber, a fluid flow path, a plurality of rows of openings open to the outside of the housing means, an annular passage means between and in communication with the openings and the fluid flow path whereby fluid from outside of the housing means can flow through said flow path, ionizing means located in said chamber operable to produce ions, ion collecting means mounted on the housing means, said ion collecting means having a plurality of spaced ion collecting members, said fluid flow path located between the ionizing means and the ion collecting means, means for maintaining an electrical potential between the ionizing means and the ion collecting means whereby ions migrate from the ionizing means across the fluid flow path and impinge on the ion collecting members producing a current in each ion collecting member, said fluid moving in the fluid flow path deflecting said ions in an amount proportional to the movement of the fluid thereby producing different currents in at least some of said ion collecting members, and amplifier means connected to each ion collecting member for receiving current therefrom, said amplifier means having an output signal corresponding to the difference in current in at least two of the ion collecting members, said output signal providing information as to the movement of the flowing fluid.

2. The apparatus of claim 1 wherein: the housing means includes a first casing having said chamber accommodating the ionizing means, said casing having a side wall provided with a first row of said openings, and a second casing having a side wall provided with a second row of said openings, said ion collecting means being attached to the second casing, said first and second casings having portions spaced from each other providing said fluid flow path.

3. The apparatus of claim 1 including: a member having a hole substantially closing one end of the chamber, said member being spaced from the ion collecting means a distance generally corresponding to the width of the fluid flow path, said ionizing means being located in the chamber in axial alignment with the hole in the member outside of the fluid flow path whereby ions migrate from the ionizing means through the hole and across the fluid flow path and impinge on the ion collecting means.

4. The apparatus of claim 3 wherein: the member is a disc having a central circular hole.

5. The apparatus of claim 3 wherein: the ionizing means includes a needle axially aligned with said hole in the member.

6. The apparatus of claim 1 wherein: the housing means includes a first casing having said chamber accommodating the ionizing means, said first casing having an outside wall provided with a first row of said openings, and said annular passage means including a first annular passage between and in communication with said first row of openings and the fluid flow path, and a second casing having an outside wall provided with a second row of said openings and said annular passage means including a second annular passage between and in communication with the second row of openings and the fluid flow path.

7. The apparatus of claim 6 wherein: the first and second casings have cylindrical side walls, said first and second rows of openings being located circumferentially around said cylindrical side walls.

8. The apparatus of claim 7 wherein: the first casing has a semi-spherical end joined to the side wall of the first casing, and the second casing has a semi-spherical end joined to the side wall of the second casing.

9. The apparatus of claim 7 wherein: said first row of openings is spaced from one side of the flow plane of said fluid flow path and the second row of openings is spaced from the other side of said plane of said fluid flow path.

10. The apparatus of claim 9 wherein: said first annular passage is located adjacent said one side of the plane of said fluid flow path and in circumferential communication with an outer circular section of said fluid flow path, and said second annular passage is located adjacent said other side of the plane of said fluid flow path and in circumferential communication with an outer circular section of said fluid flow path.

11. The apparatus of claim 10 including: an annular member located between said first and second annular passages for directing the flow of fluid from said first and second annular passages to said fluid flow path.

12. The apparatus of claim 11 wherein: said annular member has generally concave annular surfaces facing said first and second annular passages, said concave surfaces converging and terminating in an inwardly directed annular rib, said rib being located in the flow plane of said fluid flow path.

13. The apparatus of claim 6 wherein: each of said openings of the first and second row of openings comprises a generally rectangular opening having concave curved opposite ends.

14. The apparatus of claim 13 wherein: the first row of openings has the same number of openings as the second row of openings.

15. The apparatus of claim 1 wherein: each ion collecting member comprises a generally pie-shaped plate having an apex section directed toward the mid-section of the ion collecting means.

16. The apparatus of claim 15 wherein: the side edges of each ion collecting member are normally disposed relative to each other.

17. The apparatus of claim 1 wherein: the ion collecting members comprise four generally pie-shaped plates, each plate having an apex section directed toward the mid-section of the ion collecting means and side edges spaced from side edges of an adjacent plate.

18. The apparatus of claim 17 wherein: the side edges of each ion collecting member are normally disposed relative to each other.

19. The apparatus of claim 1 wherein: the ion collecting members comprise a first conductor plate having a linear edge, and a second conductor plate having a linear edge, said linear edges of the conductor plate being spaced from each other.

20. The apparatus of claim 19 wherein: said space between said linear edges is aligned with the center of the opening in the end of the housing means.

21. The apparatus of claim 19 wherein: said amplifier means is electrically connected to the first and second conductor plates and provides an output signal representative of the difference in currents in the first and second conductor plates.

22. The apparatus of claim 1 wherein: the ion collecting members comprise first separate conductor members and second separate conductor members, said amplifier means including a first differential amplifier electrically connected to said first conductor members, said first conductor members being located opposite each other to provide an output signal related to fluid velocity in a first direction, and said amplifier means including a second differential amplifier electrically connected to said second conductor members, said separate second conductor members being located opposite each other to provide an output signal related to fluid velocity in a second direction.

23. The apparatus of claim 22 wherein: the first conductor members are segments of a circle having separate oppositely disposed apex sections, and the second conductor members are segments of a circle having separate oppositely disposed apex sections.

24. The apparatus of claim 23 wherein: each segment has an inclined angle of about 90 degrees.

25. The apparatus of claim 22 wherein: the first conductor members have spaced opposed sections, and the second conductor members have spaced opposed sections.

26. The apparatus of claim 1 wherein: the ion collecting members comprise first, second, third, and fourth conductor means, said amplifier means including a first differential amplifier electrically connected to the first conductor member and a second differential amplifier electrically connected to the second conductor member, said second conductor member being located opposite the first conductor member, conductor means electrically connecting the second differential amplifier to the first differential amplifier, said first differential amplifier providing an output signal relating to fluid velocity in a first direction, said amplifier means including a third differential amplifier connected to the third conductor member and a fourth differential amplifier connected to the fourth conductor member, and electrical conductor means connecting the fourth differential amplifier with the input of the third differential amplifier, said third differential amplifier providing an output signal related to fluid velocity in a second direction.

27. The apparatus of claim 26 wherein: each first, second, third, and fourth conductor member has a generally pie shape with side edges spaced from side edges of adjacent conductor members.

28. The apparatus of claim 26 wherein: each conductor member is a segment of a circle having side edges disposed at an angle of about 90 degrees relative to each other.

29. The apparatus of claim 1 wherein: said ionizing means has a longitudinal axis aligned with the center of the ion collecting means.

30. The apparatus for measuring the velocity and direction of a fluid moving in a fluid flow path comprising: housing means having a fluid flow path, side wall means having a plurality of rows of openings open to the outside of the housing means, and annular passage means in communication with said plurality of rows of openings and the fluid flow path, ionizing means mounted on the housing means and located adjacent the fluid flow path for producing ions, ion collecting means mounted on the housing means and located adjacent the fluid flow path and generally opposite the ionizing means, said ion collecting means having more than two separated electrical conductor members, each member having angularly related side edges, the side edges of adjacent members being spaced from each other, means for maintaining an electrical potential between said ionizing means and ion collecting means whereby ions migrate from the ionizing means and impinge on the conductor members producing a current in each conductor member, said fluid moving in the fluid flow path deflecting said ions in the direction of movement of the fluid and in an amount proportional to the velocity of the fluid thereby producing different currents in at least some of the conductor members, and amplifier means electrically connected to each conductor member, said amplifier means having output signals directly proportional to the difference in the currents in selected conductor members, said signals providing information as to the velocity and direction of the moving fluid.

31. The apparatus of claim 30 wherein: the housing means includes a first casing having an outside wall provided with a first row of said openings, and a second casing having an outside wall provided with a second row of said openings, said first and second rows of openings being in communication with said annular passage means.

32. The apparatus of claim 31 wherein: the first and second casings have cylindrical side walls, said first and second rows of openings being located circumferentially around said cylindrical side walls.

33. The apparatus of claim 32 wherein: the first casing has a semi-spherical end joined to the side wall of the first casing, and the second casing has a semi-spherical end joined to the side wall of the second casing.

34. The apparatus of claim 31 wherein: said first row of openings are spaced from one side of the flow plane of the fluid flow path, and the second row of openings are spaced from the other side of said plane of said fluid flow path.

35. The apparatus of claim 34 wherein: said annular passage means comprises a first annular passage located adjacent said one side of the plane of the fluid flow path and in circumferential communication with an outer circular section of said fluid flow path, and a second annular passage located adjacent said other side of the plane of said fluid flow path in circumferential communication with an outer circular section of said fluid flow path.

36. The apparatus of claim 35 including: an annular member located between said first and second annular passages for directing the flow of fluid from said first and second annular passages to said fluid flow path.

37. The apparatus of claim 36 wherein: said annular member has generally concave annular surfaces facing said first and second annular passages, said concave surfaces converging and terminating in an inwardly directed annular rib, said rib being located in the flow plane in said fluid flow path.

38. The apparatus of claim 30 wherein: said housing means has a generally cylindrical outside wall joined to semi-spherical ends, said plurality of openings being located in said generally cylindrical side wall.

39. The apparatus of claim 38 wherein: each of said plurality of rows of openings comprises a generally rectangular opening having concave curved opposite ends.

40. The apparatus of claim 38 wherein: each row of openings has the same number of openings.

41. The apparatus of claim 30 wherein: the conductor members each comprise a generally pie-shaped plate having an apex section directed toward the mid-section of the ion collecting means.

42. The apparatus of claim 41 wherein: the side edges of each conductor member are normally disposed relative to each other.

43. The apparatus of claim 30 wherein: the more than two separated electrical conductor members comprise four generally pie-shaped plates, each plate having an apex section directed toward the mid-section of the ion collecting means and side edges spaced from side edges of an adjacent plate.

44. The apparatus of claim 43 wherein: the side edges of each conductor member are normally disposed relative to each other.

45. The apparatus of claim 30 wherein: the more than two separated electrical conductor members comprise first, second, third, and fourth conductor members located in an annular pattern with adjacent members spaced from each other.

46. The apparatus of claim 45 wherein: each first, second, third, and fourth conductor member has a generally pie shape with side edges spaced from side edges of adjacent conductor members.

47. The apparatus of claim 46 wherein: each conductor member is a segment of a circle having an angle of about 90 degrees.

48. The apparatus of claim 46 wherein: said ionizing means has a longitudinal axis aligned with a center point equally spaced from each conductor member.

49. The apparatus of claim 30 wherein: the conductor members include first separate conductor members and second separate conductor members, said amplifier means having a first differential amplifier electrically connected to said first conductor members, said first conductor members being located opposite each other to provide an output signal related to fluid velocity in a first direction, and a second differential amplifier electrically connected to said second conductor members, said second conductor members being located opposite each other to provide an output signal related to fluid velocity in a second direction.

50. The apparatus of claim 49 wherein: the first conductor members are segments of a circle having separate oppositely disposed apex sections, and the second conductor members are segments of a circle having separate oppositely disposed apex sections.

51. The apparatus of claim 50 wherein: each segment has side edges disposed at an angle of about 90 degrees relative to each other.

52. The apparatus of claim 49 wherein: the first conductor members have spaced opposite sections, and the second conductor members have spaced opposed sections.

53. The apparatus of claim 30 wherein: the conductor members include first, second, third, and fourth conductor members, said amplifier means including a first differential amplifier electrically connected to the first conductor member, a second differential amplifier electrically connected to the second conductor members, said second conductor member being located opposite the first conductor member, conductor means electrically connecting the second differential amplifier to the first differential amplifier, said first differential amplifier providing an output signal relating to fluid velocity in a first direction, a third differential amplifier connected to the third conductor member, a fourth differential amplifier connected to the fourth conductor member, electrical conductor means connecting the fourth differential amplifier with the input of the third differential amplifier, said third differential amplifier providing an output signal related to fluid velocity in a second direction.

54. The apparatus of claim 53 wherein: each first, second, third, and fourth conductor member has a generally pie shape with side edges spaced from side edges of adjacent conductor members.

55. The apparatus of claim 54 wherein: each conductor member is a segment of a circle having an angle of about 90 degrees.

56. The apparatus of claim 30 wherein: said ionizing means has a longitudnal axis aligned with the center of the ion collecting means.

57. An apparatus for measuring the movement of a fluid comprising: housing means having a fluid flow path, side wall means having a plurality of rows of openings open to the outside of the housing means, and annular passage means between and in communication with said plurality of rows of openings and the fluid flow path, whereby fluid flows through said openings and annular passage into and out of said fluid flow path, and means for sensing the flow of fluid in said fluid flow path and providing information signals providing information as to the movement of the fluid flowing in said flow path.

58. The apparatus of claim 57 wherein: the housing means includes a first casing having an outside wall provided with a first row of said openings, and a second casing having an outside wall provided with a second row of said openings, said first and second row of openings being in communication with said annular passage means.

59. The apparatus of claim 58 wherein: the first and second casings have cylindrical side walls, said first and second rows of openings being located circumferentially around said cylindrical side walls.

60. The apparatus of claim 59 wherein: the first casing has a semi-spherical end joined to the side wall of the first casing, and the second casing has a semi-spherical end joined to the side wall of the second casing.

61. The apparatus of claim 58 wherein: said first row of openings are spaced from one side of the flow plane of the fluid flow path, and the second row of openings are spaced from the other side of said plane of said fluid flow path.

62. The apparatus of claim 61 wherein: said annular passage means comprises a first annular passage located adjacent said one side of the plane of the fluid flow path and in circumferential communication with an outer circular section of said fluid flow path, and a second annular passage located adjacent said other side of the plane of said fluid flow path in circumferential communication with an outer section of said fluid flow path.

63. The apparatus of claim 62 including: an annular member located between said first and second annular passages for directing the flow of fluid from said first and second annular passages to said fluid flow path.

64. The apparatus of claim 63 wherein: said annular member has generally concave annular surfaces facing said first and second annular passages, said concave surfaces converging and terminating in an inwardly directed annular rib, said rib being located in the flow plane in said fluid flow path.

65. The apparatus of claim 57 wherein: said housing means has a generally cylindrical outside wall joined to semi-spherical ends, said plurality of openings being located in said generally cylindrical side wall.

66. The apparatus of claim 65 wherein: each of said plurality of rows of openings comprises a generally rectangular opening having concave curved opposite ends.

67. The apparatus of claim 65 wherein: each row of openings has the same number of openings.

68. The apparatus of claim 65 wherein: said plurality of rows of openings comprise a first row of openings extended around said side wall offset in one direction from the flow plane of said flow path and a second row of openings extended around said side wall offset in the direction opposite the one direction from the flow plane of said flow path.

69. The apparatus of claim 68 wherein: said annular passage means comprises a first annular passage located adjacent one side of the plane of the fluid flow path and in circumferential communication with an outer circular section of said fluid flow path, and a second annular passage located adjacent the other side of the plane of said fluid flow path in circumferential communication with an outer circular section of said fluid flow path.

70. The apparatus of claim 69 including: an annular member located between said first and second annular passages for directing the flow of fluid from said first and second annular passages to said fluid flow path.

71. The apparatus of claim 70 wherein: said annular member has generally concave annular surfaces facing said first and second annular passages, said concave surfaces converging and terminating in an inwardly directed annular rib, said rib being located in the flow plane in said fluid flow path.

* * * * *

UNITED STATES PATENT AND TRADEMARK OFFICE
CERTIFICATE OF CORRECTION

PATENT NO. : 4,394,825

DATED : July 26, 1983

INVENTOR(S) : Zell DuVall

It is certified that error appears in the above-identified patent and that said Letters Patent is hereby corrected as shown below:

Column 1, line 68, "voltage" should be -- voltages --.

Column 2, line 9, "spced" should be -- spaced --.

Column 3, line 42, "tub" should be -- hub --.

Signed and Sealed this

Twentieth Day of December 1983

[SEAL]

Attest:

GERALD J. MOSSINGHOFF

Attesting Officer  Commissioner of Patents and Trademarks